Feb. 3, 1959 B. JONES 2,871,898
COMBINATION CHISEL STRUCTURE FOR MORTISING WOODWORK
Filed Feb. 24, 1956

INVENTOR.
BRYAN JONES.
BY
Patrick D. Beavers
ATTORNEY

United States Patent Office 2,871,898
Patented Feb. 3, 1959

2,871,898

COMBINATION CHISEL STRUCTURE FOR MORTISING WOODWORK

Bryan Jones, Victoria, Tex., assignor of one-half to Lawrence Einer Bergstrom, Victoria, Tex.

Application February 24, 1956, Serial No. 567,624

2 Claims. (Cl. 145—24)

This invention relates to improvements in hand tools and more particularly to a combination chisel.

The principal object of the invention is to provide a combination chisel including a conventional chisel structure and a chipping blade, all in one unified assembly, to the end that, for instance, woodwork can be cut with the conventional chisel and then chipped out by the chipping blade to accommodate butt hinges.

Another important object of the invention is to provide a tool of the character stated which will permit "mortising out" for butt hinges in a more quick and efficient manner than with the use of separate tools as used today.

These and various other objects and advantages of the invention will become apparent to the reader of the following description.

Figure 1:
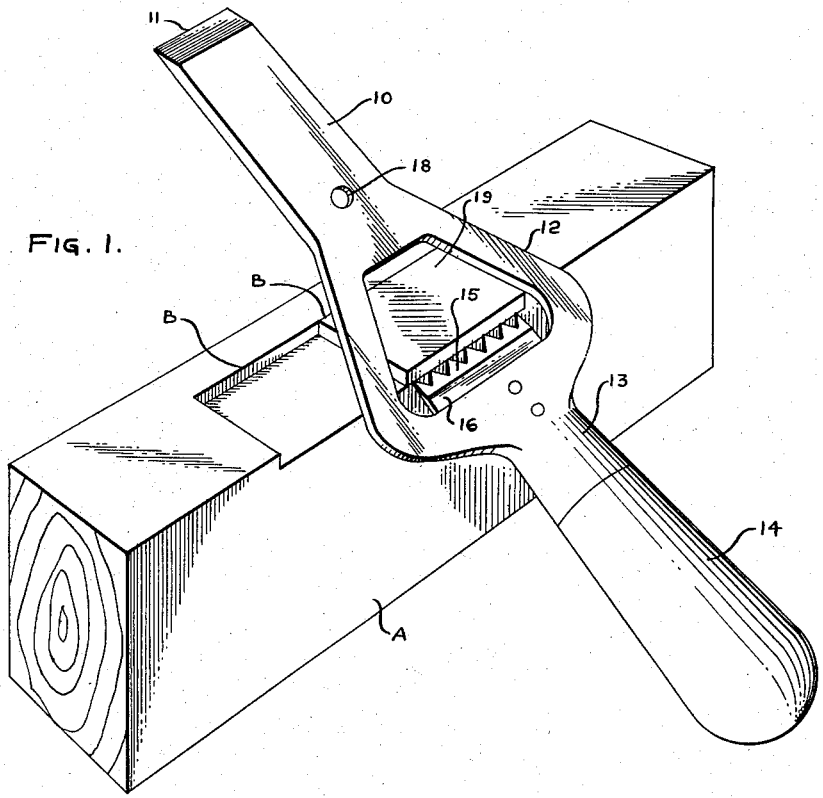
Figure 1 is a perspective view of the tool being used against woodwork.

Referring to the drawing wherein like numerals designate like parts, it can be seen that the combination implement consists of a tempered steel blade 10 having a cutting edge 11 and the inner end portion of this blade is bulged as at 12 and extended to provide a socket 13 for the forward portion of a handle 14.

Figure 2:
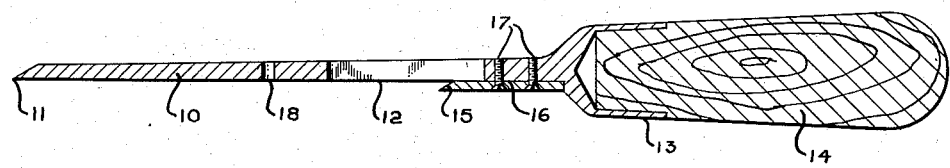
Figure 2 is a longitudinal sectional view through the tool, taken on line 2—2 of Figure 3.
Figure 3:
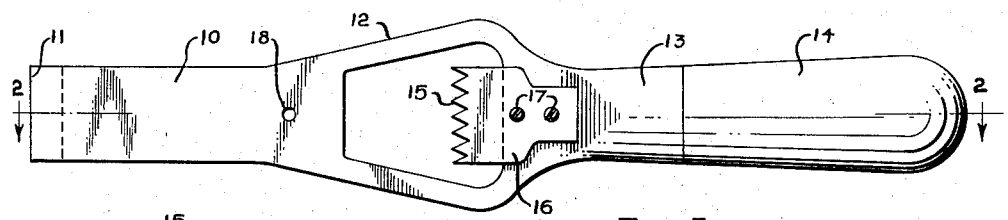
Figure 3 is a bottom plan view of the tool.
Figure 4:
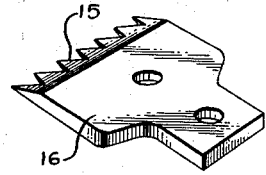
Figure 4 is a perspective view of the chipping blade.

The bulge portion 12 describes a framelike structure having a substantially triangular-shaped opening into which projects the serrated edge portion 15 of a chipping blade 16, which blade is secured to the innermost portion of the bulged portion 12 by a pair of set screws 17, 17. The chipping blade 16 is secured to the bottom side of the bulged portion 12 as suggested in Figures 2 and 3.

The blade 10 can be formed with an opening 18 so that the tool can be hung over a nail or other hanger.

In the use and operation of this tool, it can be seen that reference character A denotes a piece of woodwork. The woodwork is preferably first alined for the mortising work, the chisel 10 with its edge 11 having been used to form the cuts B. When these cuts have been made, the tool is moved to the position shown in Figure 1 with the chipping blade 16 engaging at the desired position, and all that is required is an input action of the tool by pressure or jarring on the handle 14 and the wood portion 19 is chiselled out and the mortise formed.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

1. A mortising tool comprising a handle, an open enlarged frame projecting from one end of the handle, a mortising blade secured to the frame and projecting under the open part of the frame and a chisel shank projecting from the frame in substantial alignment with the handle and also serving as a handle when the device is used to remove material through the action of the mortising blade, said frame being sufficiently large and formed with an opening having walls in the vicinity of the blade spaced from each other a distance greater than the width of the blade, to permit the passage therethrough of a mortised slab, as it is being cut.

2. A mortising tool comprising a handle, an open enlarged frame projecting from one end of the handle, a mortising blade secured to the frame and projecting under the open part of the frame and a chisel shank projecting from the frame in substantial alignment with the handle and also serving as a handle when the device is used to remove material through the action of the mortising blade, said frame being sufficiently large and formed with an opening having walls in the vicinity of the blade spaced from each other a distance greater than the width of the blade, to permit the passage therethrough of a mortised slab, as it is being cut, said mortising blade being beveled upwardly and rearwardly toward the first mentioned handle, to not only cut the slab and separate it from the stock proper, but to also guide the same upwardly through said frame.

References Cited in the file of this patent

UNITED STATES PATENTS

| 296,501 | Albrecht | Apr. 8, 1884 |
| 361,145 | Donaldson | Apr. 12, 1887 |